United States Patent [19]
Kato et al.

[11] Patent Number: 6,041,119
[45] Date of Patent: Mar. 21, 2000

[54] HANDSET DETECTION DEVICE FOR USE IN TELEPHONES

[75] Inventors: Hiroyuki Kato; Masahiko Sasa, both of Nagoya, Japan

[73] Assignee: Brother Kogyo Kabushiki Kaisha, Nagoya, Japan

[21] Appl. No.: 09/065,513

[22] Filed: Apr. 24, 1998

[30] Foreign Application Priority Data

May 6, 1997 [JP] Japan .................................. 9-115422

[51] Int. Cl.$^7$ .................................................. H04M 1/00
[52] U.S. Cl. ......................................................... 379/424
[58] Field of Search .................................... 379/424, 425, 379/426, 428, 455, 446, 454, 435, 436; 358/442, 434, 468

[56] References Cited

U.S. PATENT DOCUMENTS 2,878,315  3/1959  Agule ........................................ 379/424
3,168,621  2/1965  Roberts et al. ........................... 379/424

*Primary Examiner*—Jack Chiang
*Attorney, Agent, or Firm*—Oliff & Berridge, PLC

[57] ABSTRACT

A handset detection device for use in telephones comprises a movable member 2, a circuit board 4, a detector 5, and a cushioning member 3. The movable member 2 has a concave portion 28 on a contact surface 2A, in which the cushioning member 3 is so fitted as to protrude toward the circuit board 4 by a predetermined amount. When the movable member 2 is rotated toward the circuit board 4 upon placement of a handset 8 onto a handset holding base 9, the cushioning member 3 is deformed by the contact with the circuit board 4 to reduce the moving speed of the movable member 2. The movable member 2 is then stopped by making the contact surface 2A come into contact with an upper surface 4A of the circuit board 4. Accordingly, the movable member 2 can be stopped at a predetermined position, whereby to prevent detection failure by a detection sensor 31 in connection with the movable member 2, achieving a precise detection.

15 Claims, 7 Drawing Sheets

PRIOR ART

HANDSET DETECTION DEVICE FOR USE IN TELEPHONES

BACKGROUND OF THE INVENTION

1. Field of the Invention

The present invention relates to a handset detection device for use in telephone sets, telephone units incorporated in communication devices such as a facsimile machine, etc., and particularly to a handset detection device for detecting whether a handset is placed on a handset holding base.

2. Description of Related Art

Conventionally, telephone sets or telephone units incorporated in communication devices such as a facsimile machine are provided with a handset detection device for detecting whether a handset is placed on a handset holding base to know a transmitting/receiving state of the handset. This conventional handset detection device applied to a facsimile machine is described with reference to FIG. 6.

In FIG. 6, a facsimile machine 50 is provided with a device body 51 and a handset holding base 52 formed on the device body 51. A telephone handset 53 is to be placed on the handset holding base 52. A push switch 55 is provided in the holding base 52 at a front recess 54 thereof and fixed to an axis 56 supported in an inner space of the holding base 52. This push switch 55 is biased upward so as to protrude in the recess 54 by a coil spring 57 disposed in the inner space of the holding base 52, while it can be rotated downward against the biasing force of the coil spring 57 when the handset 53 is placed on the holding base 52. A movable lever 58 which extends inside the device body 51 is also fixed to the axis 56 to which the push switch 55 is secured. The movable lever 58 is interlocked with the push switch 55 whereby to be rotated in correspondence with the rotation of the push switch 55 and thus is connected with a handset detection device 60.

The handset detection device 60 is provided with a movable member 61 having a triangle shape, which is rotatably supported on an axis fixedly provided in the device body 51. At a portion corresponding to a bottom side of the movable member 61, a projection 63 is formed and will come into contact with a circuit board 62 provided on an inward bottom of the device body 51. On the circuit board 62 are provided a cushioning member 64 for reducing a moving speed (a rotating speed) of the movable member 61 and a detection sensor 65 for detecting a stopped position of the movable member 61. The rotation of the movable member 61 causes the projection 63 thereof to come into contact with the cushioning member 64.

When the handset 53 is placed on the holding base 52, the push switch 55 is pressed down by the handset 53 and rotated to be retracted into the inner space of the holding base 52. With the rotation of the push switch 55, the movable lever 58 interlocked with the push switch 55 is made to rotate in the same direction, when a guide shaft 66 of the movable lever 58 is engaged with a cutout 67 of the movable member 61 to transmit a rotating force of the movable lever 58 to the movable member 61. This movable member 61 is thus rotated toward the circuit board 62. Upon rotation of the movable member 61 toward the circuit board 62, the projection 63 of the movable member 61 comes into contact with the cushioning member 64 as shown in FIG. 7. At this time, the moving speed (rotating speed) of the movable member 61 is attenuated by deformation of the cushioning member 64 to stop the movable member 61 on the circuit board 62. The movable member 61 stopped on the circuit board 62 blocks a detection light of the detection sensor 65, so that the stopped position of the movable member 61 is detected whereby to detect that the handset 53 is placed on the holding base 52.

However, the above conventional handset detection device is arranged such that the moving speed (rotating speed) of the movable member 61 which rotates toward the circuit board 62 is reduced by the deformation of the cushioning member 64, and therefore, the size of the cushioning member 64 must be made precise because unevenness in the cushioning members 64 requires adjustment of the position of the detection sensor 65 for each facsimile machine. For accurately detecting the position of the movable member 61, accordingly, it needs to enhance the precision in size of the cushioning member 64 or adjust the position of the detection sensor 65, resulting in an increased manufacturing cost of the handset detection device.

SUMMARY OF THE INVENTION

The present invention has been made in view of the above circumstances and has an object to overcome the above problems and to provide a handset detection device for use in telephones capable of performing a precise detection using a detector as to whether a handset is placed on a handset holding base by stopping a movable member at a predetermined position.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, according to this invention, there is provided a handset detection device for use in telephones provided with a handset and a handset holding base, for detecting the handset at a point of time whereat the handset is placed on the handset holding base, the handset detection device comprising a movable member which moves in a predetermined direction upon a placement of the handset on the handset holding base, a stopper member for stopping the movable member by coming into contact with a contact portion of the movable member, the stopper member being disposed below the movable member, a detector for detecting the movable member stopped by the stopper member to detect the placement of the handset on the handset holding base, the detector being disposed on the stopper member, and an elastic member for reducing a moving speed of the movable member before it is stopped by the stopper member coming into contact with the contact portion of the movable member, the elastic member being disposed in a vicinity of the contact portion of the movable member.

In the above handset detection device, the movable member is made to rotate when the handset is placed on the holding base, and is stopped at a predetermined position upon contact with the stopper member after the moving speed of the movable member is reduced by the elastic member. Accordingly, large noise such that it might be caused when the movable member comes into contact with the stopper member at high speed can be prevented from occurring. Also, since the movable member can precisely be stopped at a predetermined position, the detector is prevented from detecting the position of the movable member in error.

According to another aspect of the present invention, there is provided a handset detection device for use in telephones provided with a handset and a handset holding base, for detecting the handset at a point of time whereat the handset is placed on the handset holding base, the handset detection device comprising a movable member which moves in a predetermined direction upon a placement of the handset on the handset holding base, a stopper member for stopping the movable member by coming into contact with a contact portion of the movable member, the stopper member being disposed below the movable member, a detector for detecting the movable member stopped by the stopper member to detect the placement of the handset on the handset holding base, the detector being disposed on the stopper member, a projecting portion formed in the movable member so as to extend downward, the projecting portion being made to come into contact with the stopper member to stop the movable member, and an elastic member for reducing a moving speed of the movable member before the projecting portion comes into contact with the stopper member, the elastic member being disposed in contact with a side surface of the projecting portion.

In the above handset detection device, since the elastic member is provided in connection with the projecting portion of the movable member, the elastic member is supported by the projecting portion at the time of reducing the moving speed of the movable member by contacting with the stopper member. Accordingly, the elastic member can be maintained in an attached state for a long time.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a handset detection device embodying the present invention will now be given referring to the accompanying drawings.

Figure 1:
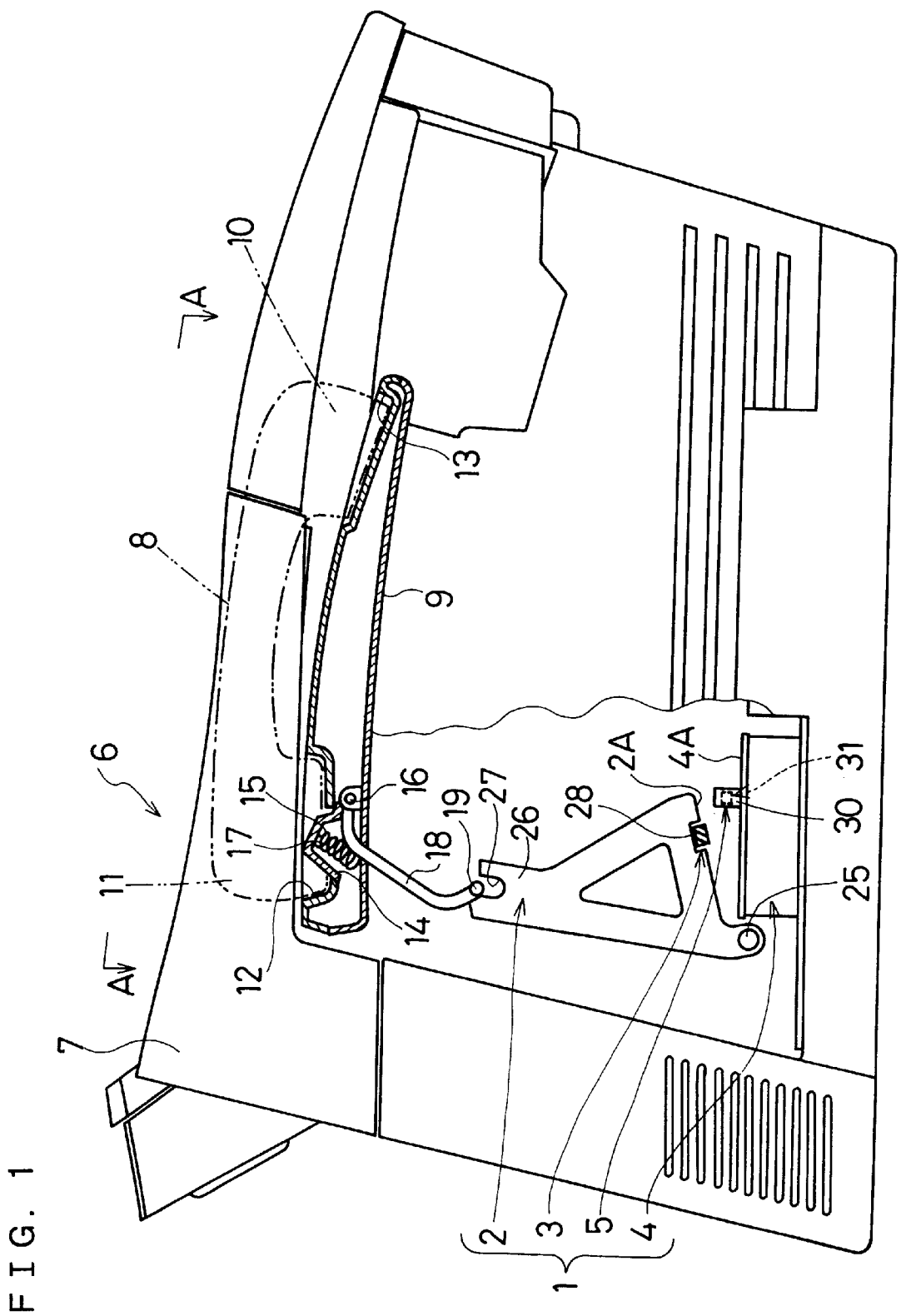
FIG. 1 is a side view of a facsimile machine provided with a handset detection device in an embodiment according to the present invention.
Figure 2:
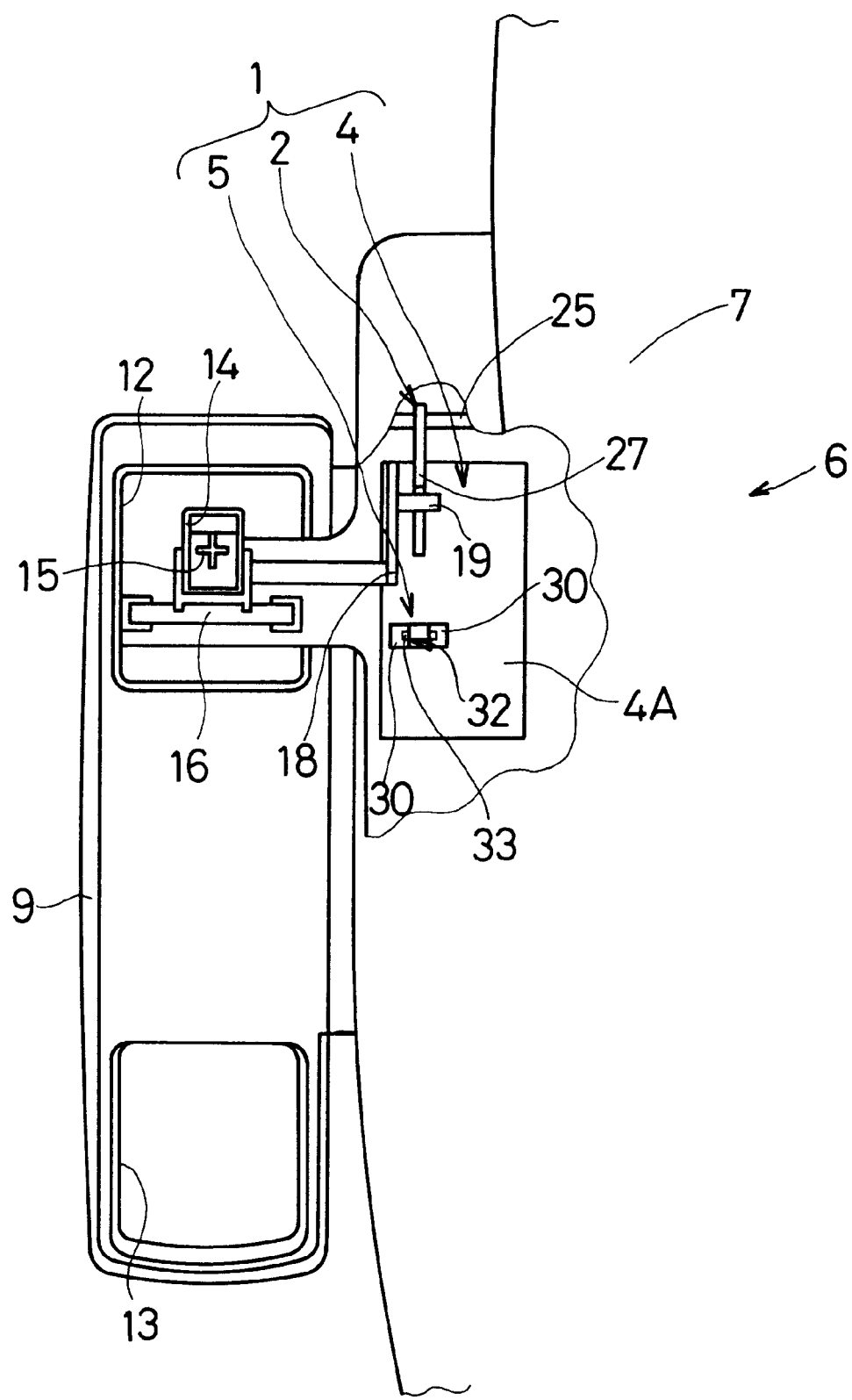
FIG. 2 is an enlarged partial view seen from an arrow A in FIG. 1.

FIGS. 1 and 2 show a handset detection device 1 used in a telephone unit of a facsimile machine 6 in the present embodiment.

In FIGS. 1 and 2, the facsimile machine 6 is provided with a device body 7 and a handset holding base 9 formed on the device body 7, on which a telephone handset 8 is usually placed. The handset detection device 1 is disposed in the inside of the device body 7. The holding base 9 is provided at its front and rear ends with two recesses 12 and 13 for holding a transmitter 10 and a receiver 11 of the handset 8. In the front recess 12 of the holding base 9, an opening is formed acting as a switch hole 14 in which a push switch 15 is inlaid so as to be movable outward or inward with respect to the holding base 9.

The push switch 15 is secured to an axis 16 rotatably supported in an inner space of the holding base 9, and is always biased to protrude from the inner space to the front recess 12 of the holding base 9 by a return spring 17 (for example, a coil spring and the like) disposed in the inner space of the holding base 9. The push switch 15 is pressed against the spring force of the return spring 17 when the handset 8 is placed on the holding base 9 to rotate about the axis 16 toward the inner space of the holding base 9, retreating therein. On removal of the handset 8, on the other hand, the push switch 15 is made to rotate back by the spring force of the return spring 17, thus protruding from the inner space to the front recess 12.

To the axis 16 to which the push switch 15 is fixed, or to the push switch 15, fixed is a movable lever 18 that is formed in a C-liked shape with bent portions and extends inward in the device body 7. This movable lever 18 is interlocked with the push switch 15 and the axis 16, and therefore, is rotated in the same direction upon rotation of the push switch 15 and the axis 16. A guide shaft 19 is provided to a tip end of the movable lever 18 extending in the device body 7 and is connected with the handset detection device 1.

The handset detection device 1 of the telephone unit installed in the facsimile machine 6 will be described below in detail, referring to FIG. 1 to FIG. 3.

Figure 3A:
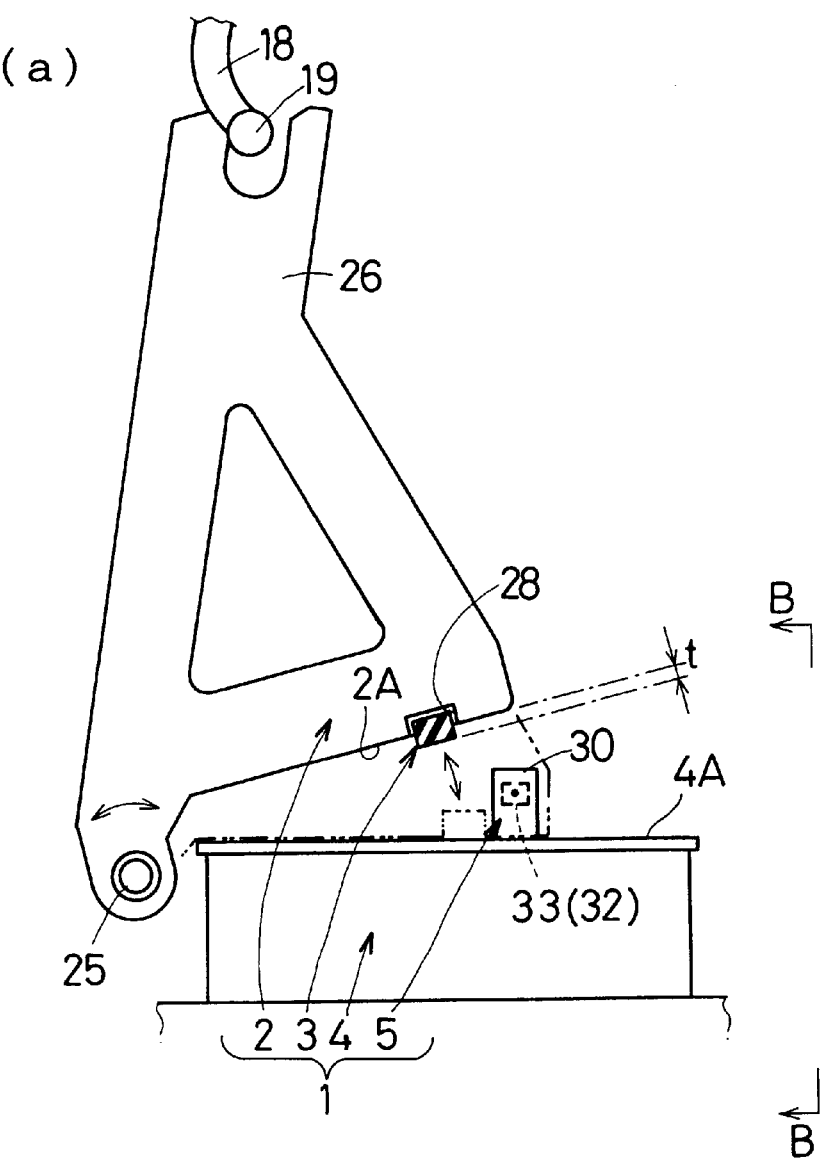
FIG. 3(a) is an enlarged view of the handset detection device in the embodiment.

As shown in FIG. 1 to FIG. 3, the handset detection device 1 is disposed in the device body 7 of the facsimile machine 6. This handset detection device 1 comprises a movable member 2 rotatably supported on an axis 25 fixed in the device body 7. This movable member 2 is made to come into contact with a circuit board 4 acting as a stopper mounted on a bottom of the inside of the device body 7, and thus is stopped at a predetermined position. The movable member 2 is formed like a triangle flat plate including a contact surface 2A which is opposite to an upper surface 4A of the circuit board 4 and comes into contact thereto. At an upper corner of the triangle movable member 2 is integrally formed a guide portion 26 extending toward the movable lever 18. In the guide portion 26 of the movable member 2, a cutout 27 is formed, with which the guide shaft 19 of the movable lever 18 can be engaged.

When the handset 8 is placed on the holding base 9, the push switch 15 is rotated with the movable lever 18 to cause the guide shaft 19 to engage with the output 27, transmitting the force due to the rotation of the push switch 15 and the movable lever 18 to the movable member 2. The movable member 2 is thus rotated to come into contact with the circuit board 4 acting as a stopper. On the other hand, when the handset 8 is lifted up or removed from the holding base 9, the push switch 15 and the movable lever 18 are rotated in an inverse direction to the above by the spring force of the return spring 17, which is transmitted through the engagement between the guide shaft 18 and the output 27 to the movable member 2. Thus, the movable member 2 is rotated away from the circuit board 4.

A cushioning member 3 (an elastic member) is provided on the contact surface 2A of the movable member 2, which is a porous member made of sponge, resin foam, or the like. This cushioning member 3 is inlaid in a concave portion 28 formed in the contact surface 2A so as to protrude from the concave portion 28 by a predetermined amount "t" (as indicated in FIG. 3) in a state of facing to the circuit board 4. The material of the cushioning member 3 and the protruding amount from the concave portion 28 are so determined that after the moving speed of the movable member 2 that will come into contact with the circuit board 4 is reduced by deformation of the cushioning member 3 within its elastic capacity, the movable member 2 is made to come into contact at the contact surface 2A with the upper surface 4A of the circuit board 4.

Accordingly, the contact surface 2A of the movable member 2 rotating toward the circuit board 4 comes into contact with the upper surface 4A of the circuit board 4 after the cushioning member 3 contacts the circuit board 4 and is deformed within the elastic property to reduce the moving speed of the movable member 2, so that the movable member 2 can accurately be placed and stopped at a predetermined position with respect to the circuit board 4, and noise caused by the contact of the movable member 2 to the circuit board 4 can also be prevented.

Figure 3B:
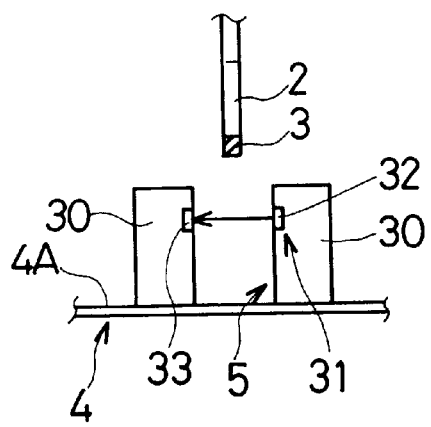
FIG. 3(b) is a partial view of the handset detection device seen from an arrow B in FIG. 3(a)

A detector 5 for detecting the position of the movable member 2 is provided on the upper surface 4A of the circuit board 4. This detector 5 is, as shown in FIG. 3(b), provided with a pair of blocks 30 and 30 and a detection sensor 31 such as a photosensor and the like, which are disposed on a movement track (rotation track) of the movable member 2 and fixed on the upper surface 4A of the circuit board 4 so that the movable member 2 can be rotated to enter between the detection blocks 30 and 30. The detection sensor 31 is constructed of a light projector 32 and a light receiver 33 which receives the detection light projected from the light projector 32. Those light projector 32 and the light receiver 33 are provided in the pair of detection blocks 30 respectively as shown in FIGS. 1 and 3(b) such that the detection light of the light projector 32 is blocked by the movable member 2 moved between the detection blocks 30.

Figure 4:
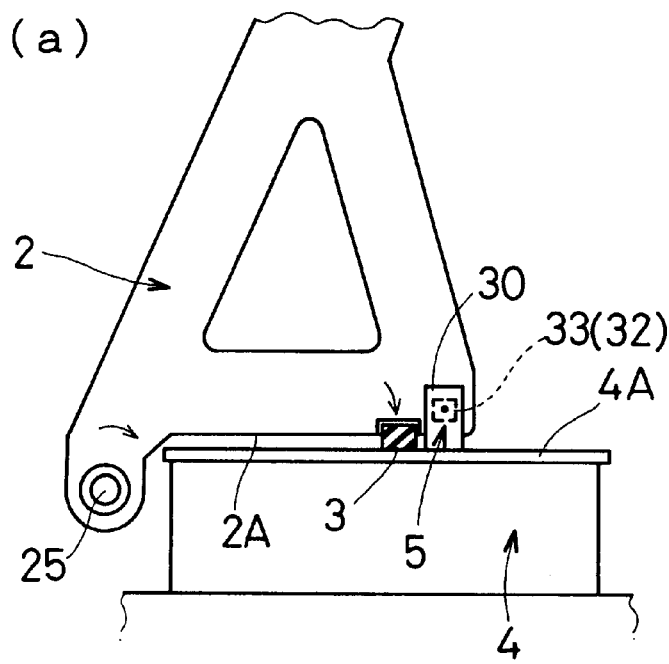
FIG. 4(a) is a partial view of the handset detection device, showing an operation to reduce a moving speed of a movable member, particularly a state where a cushioning member is in contact with a circuit board.
FIG. 4(b) is a partial view of the handset detection device, showing an operation to reduce a moving speed of a movable member, particularly a state where the cushioning member is deformed to allow the movable member come into contact with the circuit board.
Figure 4:
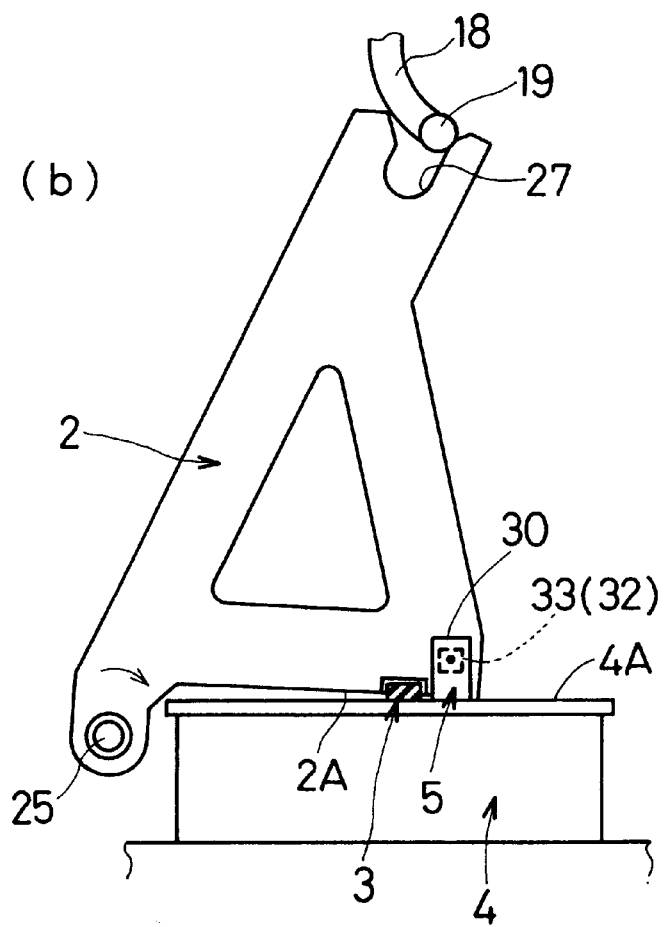

Next, the operation for reducing the moving speed of the movable member 2 in the handset detection device 1 will be described with reference to FIG. 1 and FIG. 4.

When the handset 8 which has been removed from the holding base 9, thereby allowing the movable member 2 to move away from the circuit board 4, is replaced on the handset holding base 9, i.e., the recesses 12 and 13, the push switch 15 is pressed by the handset 8. The pressed push switch 15 is rotated against the force of the return spring 17, while the movable lever 18 fixed to the axis 16 is rotated in the same direction at the same time. Upon rotation of the movable lever 18, the guide shaft 19 is made to engage with the cutout 27 of the movable member 2 to transmit the rotating force of the movable lever 18 to the movable member 2, making the movable member 2 rotate toward the circuit board 4.

When the movable member 2 is rotated in accordance with the movement of the movable lever 18, the cushioning member 3 provided protruding from the contact surface 2A first comes into contact with the upper surface 4A of the circuit board 4 as shown in FIG. 4(a), and a corner (a right corner in the drawing) of the movable member 2 is inserted between the pair of the detection blocks 30, thereby blocking the detection light of the detection sensor 31. The contact with the upper surface 4A of the circuit board 4 causes the deformation of the cushioning member 3 within the elastic property as shown in FIG. 4(b), whereby to reduce the moving speed (rotating speed) of the movable member 2. The contact surface 2A then comes into contact with the upper surface 4A of the circuit board 4 to stop the movable member 2 there. At this time, the movable member 2 is made to fully reduce the moving speed by the deformation of the cushioning member 3 within the elastic property and the movable member 2 is prevented from rotating in an opposite direction (a direction away from the circuit board 4) by the engagement between the guide shaft 19 of the movable lever 18 and the cutout 27, reducing the generation of noise caused by the contact of the movable member 2 to the circuit board 4, and positioning the movable member 2 as stopped at a predetermined position. The detection sensor 31 detects the stopped position of the movable member 2.

On removal of the handset 8 from the holding base 9, the push switch 15 is rotated back to protrude in the front recess 12 of the holding base 9 by the spring force of the return spring 17, and the movable lever 18 is also rotated in the same direction. With the rotation of the push switch 15 and the movable lever 18, the movable member 2 is caused to rotate in a direction away from the circuit board 4 through the engagement of the output portion 27 with the guide shaft 19 to return to a state shown in FIG. 1.

As mentioned above, in the handset detection device 1 in the above embodiment, the push switch 15 is pressed by the handset 8 placed on the holding base 9 to cause the rotation of the movable member 2, and the movable member 2 is stopped in contact with the circuit board 4 (a stopper means) with the moving speed reduced by the cushioning member 3 (an elastic means). Therefore, even if the movable member 2 is rotated at the same high speed as the rotating speed of the push switch 15 when pressed, the moving speed of he movable member 2 is reduced by the cushioning member 3 before the movable member 2 comes into contact with the circuit board 4, which makes it possible to prevent the movable member 2 contacting with the circuit board 4 from generating large noise.

Also, since the movable member 2 is precisely stopped at a predetermined position after reduction of the moving speed by the cushioning member 3, thus being positioned in place, the detection sensor 31 such as a photosensor can accurately detect whether the handset 8 is placed on the holding base 9 without detection failure with respect to the stopped position of the movable member 2.

Accordingly, it is unnecessary to make the cushioning member 3 (an elastic means) with high precision and to adjust the position of the detection sensor 31 according to the change in the stopped position of the movable member 2. This can achieve to provide a handset detection device 1 at low cost.

Since the cushioning member 3 acting as an elastic means is made of a general porous member, the handset detection device can be manufactured at low cost.

Furthermore, the attachment of the cushioning member 3 to the movable member 2 can be completed in such a simple operation that the cushioning member 3 is only fitted in the concave portion 28 of the movable member 2, thus improving the assembling operation of the handset detection device 1.

Since the circuit board 4 provided with the detector 5 constructed of the detection blocks 30 and the detection sensor 31 is further used as a stopper member, the cost of parts and the space for arrangement can be reduced as compared with the structure wherein individual parts or members are provided for the stopper means and the circuit board.

In the handset detection device 1 in the above embodiment, a structure where the cushioning member 3 is fitted in the concave portion 28 of the movable member 2; however, the present invention is not limited thereto. Any structure may be adopted only if the movable member 2 is made to come into contact with the circuit board 4 after the moving speed is reduced by the cushioning member 3.

Figure 5A:
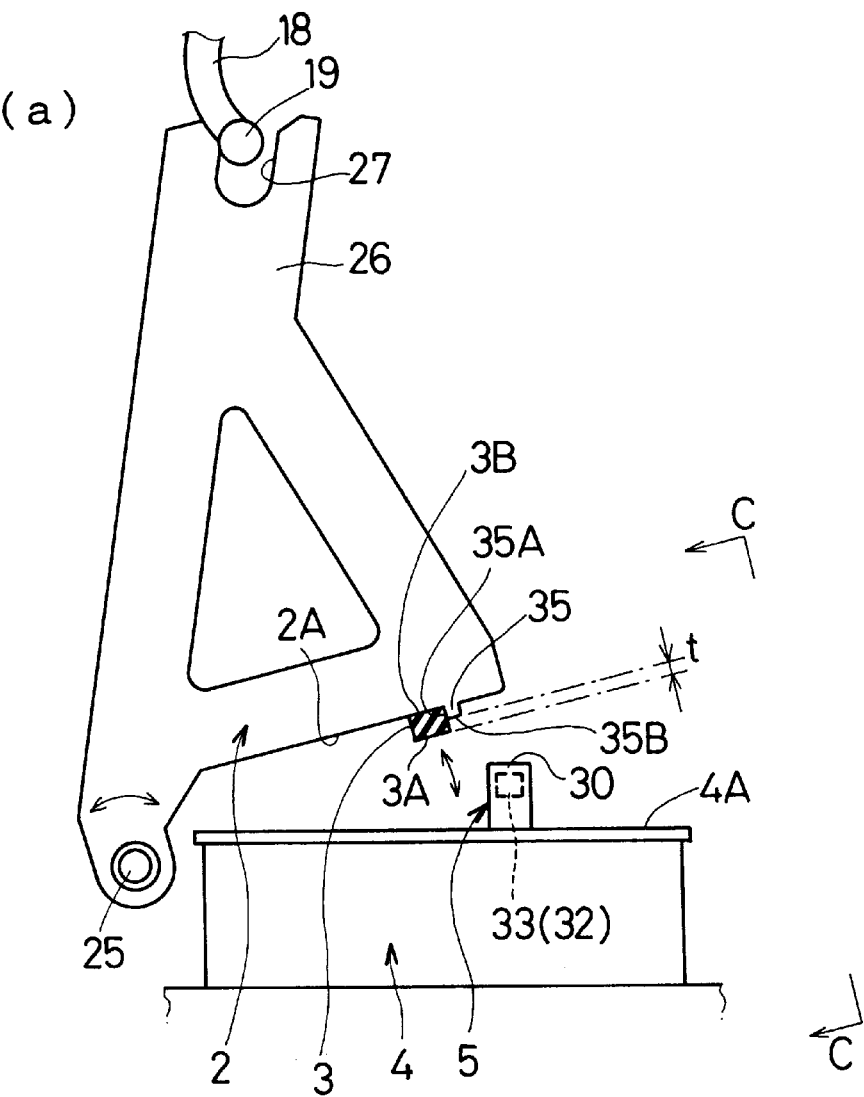
FIG. 5(a) is an enlarged view of another example of the handset detection device.
Figure 5B:
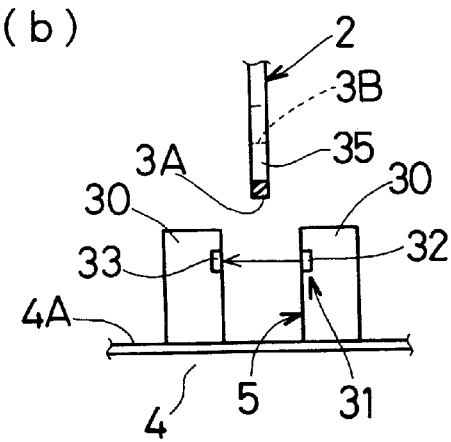
FIG. 5(b) is a partial view of the handset detection device seen from an arrow C in FIG. 5(a)
Figure 6:
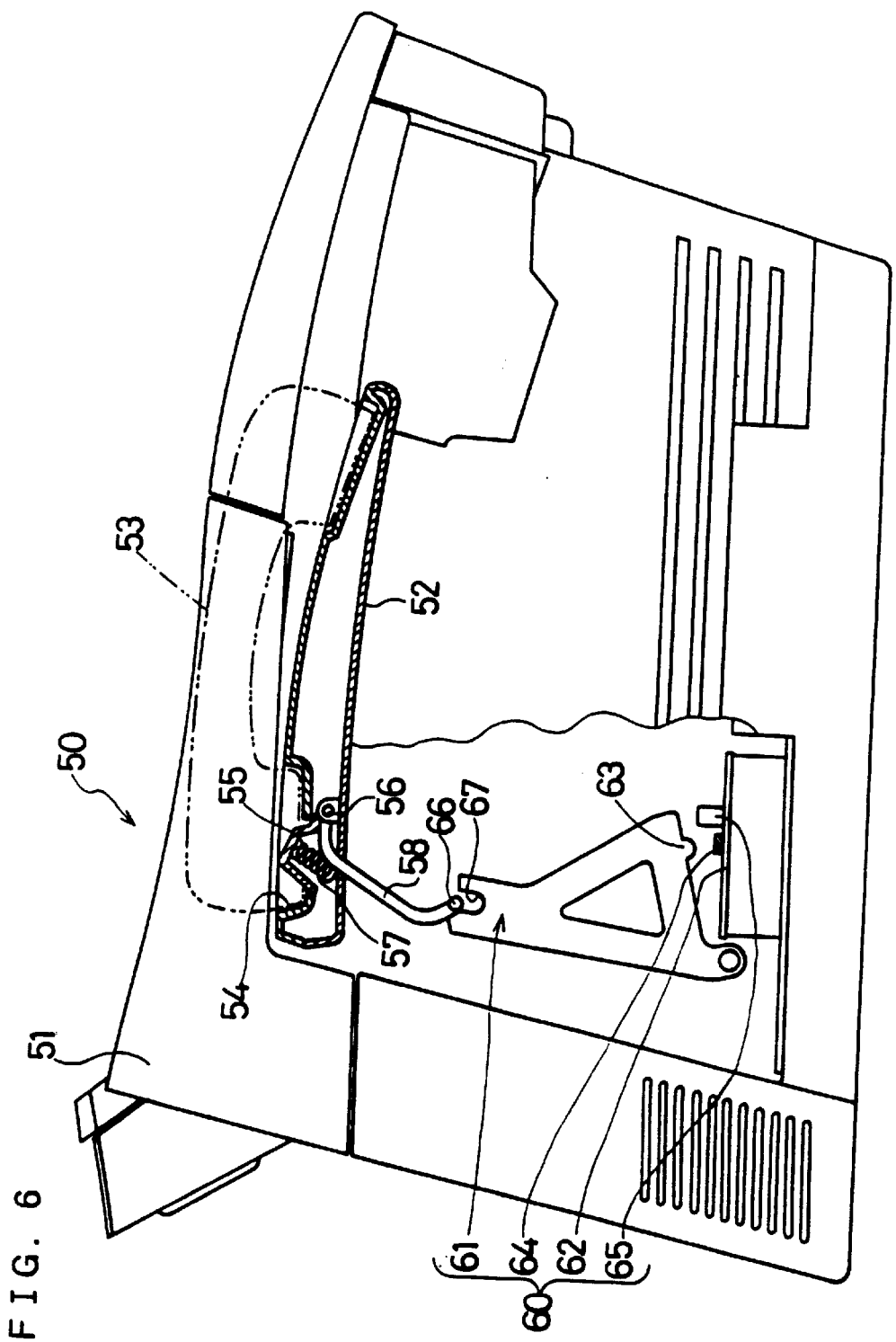
FIG. 6 is a side view of a facsimile machine provided with a conventional handset detection device.
Figure 7:
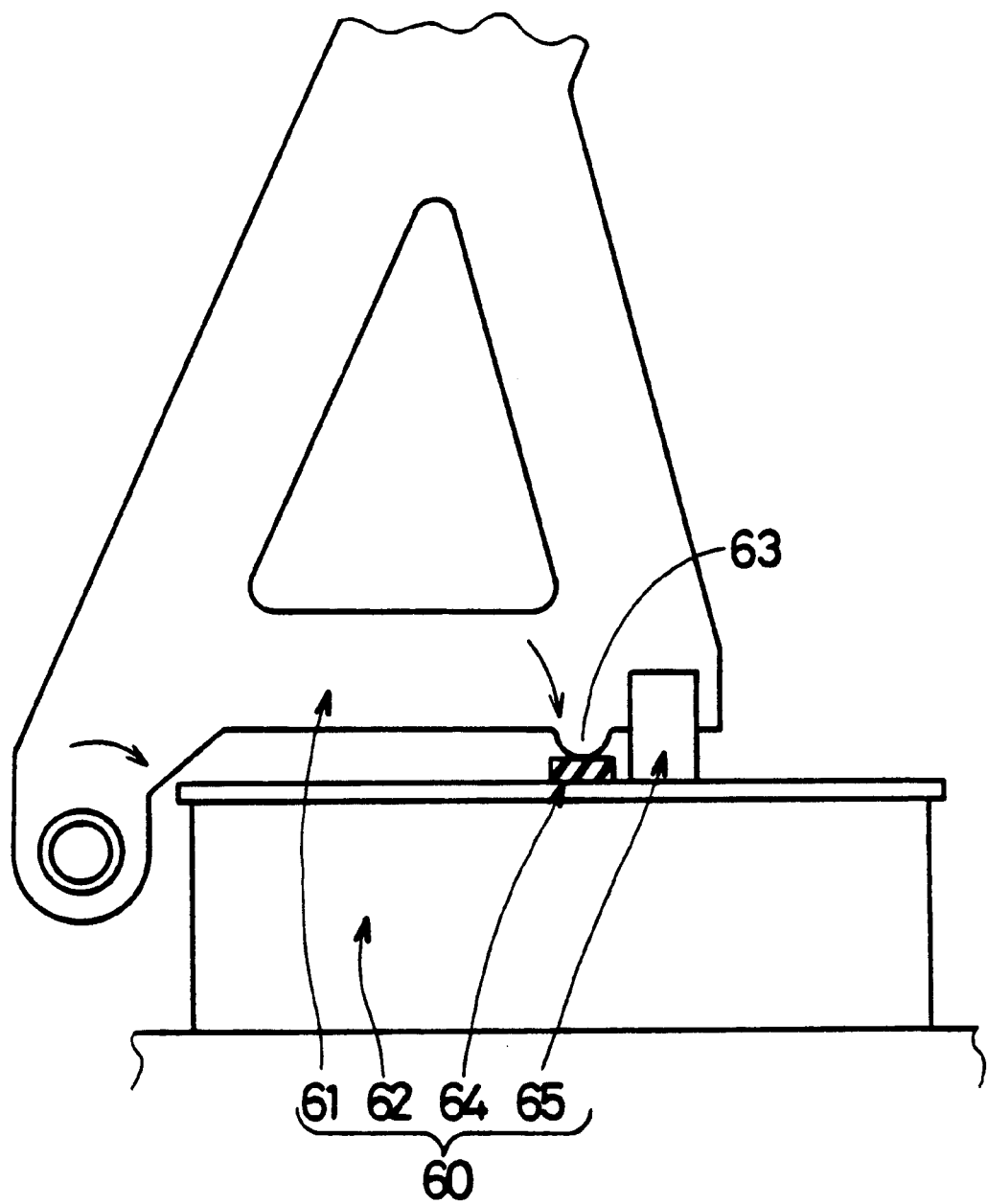
FIG. 7 is an enlarged partial view of FIG. 6, showing an operation to reduce the speed of a movable member in the conventional handset detection device.

For example, as shown in FIGS. 5(a) and 5(b), a convex portion 35 (a projecting portion) is provided on the contact surface 2A of the movable member 2, extending toward the upper surface 4A of the circuit board 4. The cushioning member 3 is attached to the movable member 2 in a state that the cushioning member 3 is in contact with the contact surface 2A and a side surface 35A of the convex portion 35 so as to protrude by a predetermined amount "t" from the tip end of the convex portion 35.

In the above structure, a lower surface 3A of the cushioning member 3 first comes into contact with the upper surface 4A of the circuit board 4 before the movable member 2 when rotated comes into contact with the circuit board 4, causing deformation of the cushioning member 3 whereby to fully reduce the moving speed of the movable member 2, and then a contact surface 35B of the convex portion 35 comes into contact with the upper surface 4A of the circuit board 4 to stop the movable member 2. Accordingly, the occurrence of noise caused by the contact of the movable member 2 to the circuit board 4 can be reduced, and the position of the movable member 2 can be determined to the stopped position.

The cushioning member 3 is provided on the movable member 2 with the upper surface 3B contact with the contact surface 2A of the movable member 2 and the side surface 35A of the convex portion 35, while the lower surface 3A of the cushioning member 3 is made to come into contact with the upper surface 4A of the circuit board 4. Therefore, when the moving speed of the movable member 2 is reduced by making the cushioning member 3 come into contact with the circuit board 4, the upper surface 3B of the cushioning member 3 is supported by the convex portion 35 including the movable member 2, which can maintain the attachment state of the cushioning member 3 on the movable member 2 for a long time.

It is noted that the telephone unit provided in the facsimile machine has been described in the above embodiment, but the present invention is not limited thereto and may be applied to other telephones or communication devices having a telephone unit to detect whether a handset is placed on a handset holding base.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A handset detection device for use in telephones provided with a handset and a handset holding base, for detecting the handset at a point of time whereat the handset is placed on the handset holding base, the handset detection device comprising:

a movable member which moves in a predetermined direction upon a placement of the handset on the handset holding base;

a stopper member for stopping the movable member by coming into contact with a contact portion of the movable member, the stopper member being disposed below the movable member;

a detector for detecting the movable member stopped by the stopper member to detect the placement of the handset on the handset holding base, the detector being disposed on the stopper member; and an elastic member for reducing a moving speed of the movable member before it is stopped by the stopper member coming into contact with the contact portion of the movable member, the elastic member being disposed in a vicinity of the contact portion of the movable member.

2. A handset detection device according to claim 1, further comprising a concave portion formed in the movable member in the vicinity of the contact portion thereof, in which the elastic member is fitted.

3. A handset detection device according to claim 2, wherein the elastic member in a fitted state in the concave portion is protruded downward by a predetermined amount from the concave portion.

4. A handset detection device according to claim 3, wherein the predetermined protruding amount of the elastic member is determined so that the elastic member is so deformed upon contact with the stopper member as to reduce the moving speed of the movable member.

5. A handset detection device according to claim 1, wherein the elastic member is made of porous material.

6. A handset detection device according to claim 5, wherein the porous material is sponge or resin foam.

7. A handset detection device according to claim 1, wherein the detector comprises a photosensor provided with a light projector and a light receiver.

8. A handset detection device according to claim 7, further comprising a circuit board on which the photosensor is mounted, the circuit board acting as the stopper member.

9. A handset detection device for use in telephones provided with a handset and a handset holding base, for detecting the handset at a point of time whereat the handset is placed on the handset holding base, the handset detection device comprising:

a movable member which moves in a predetermined direction upon a placement of the handset on the handset holding base;

a stopper member for stopping the movable member by coming into contact with a contact portion of the movable member, the stopper member being disposed below the movable member;

a detector for detecting the movable member stopped by the stopper member to detect the placement of the handset on the handset holding base, the detector being disposed on the stopper member;

a projecting portion formed in the movable member so as to extend downward, the projecting portion being made to come into contact with the stopper member to stop the movable member; and an elastic member for reducing a moving speed of the movable member before the projecting portion comes into contact with the stopper member, the elastic member being disposed in contact with a side surface of the projecting portion.

10. A handset detection device according to claim 9, wherein the elastic member is protruded downward by a predetermined amount from the projecting portion.

11. A handset detection device according to claim 10, wherein the predetermined protruding amount of the elastic member is determined so that the elastic member is so deformed upon contact with the stopper member as to reduce the moving speed of the movable member.

12. A handset detection device according to claim 11, wherein the elastic member is made of porous material.

13. A handset detection device according to claim 12, wherein the porous material is sponge or resin foam.

14. A handset detection device according to claim 9, wherein the detector comprises a photosensor provided with a light projector and a light receiver.

15. A handset detection device according to claim 14, further comprising a circuit board on which the photosensor is mounted, the circuit board acting as the stopper member.

* * * * *